(12) United States Patent
Schneider et al.

(10) Patent No.: US 10,850,773 B2
(45) Date of Patent: Dec. 1, 2020

(54) CHASSIS FOR A MOTOR VEHICLE

(71) Applicant: Ford Global Technologies, LLC, Dearborn, MI (US)

(72) Inventors: Stefan Schneider, Rösrath (DE); Dominik Mueller, Euskirchen (DE); Marius Sawatzki, Pulheim (DE); Daniel Meckenstock, Wuppertal (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 81 days.

(21) Appl. No.: 16/408,728

(22) Filed: May 10, 2019

(65) Prior Publication Data

US 2019/0351945 A1 Nov. 21, 2019

(30) Foreign Application Priority Data

May 16, 2018 (DE) ......................... 10 2018 207 597

(51) Int. Cl.
  *B62D 21/15* (2006.01)
  *B60R 19/24* (2006.01)
  *B62D 21/02* (2006.01)

(52) U.S. Cl.
  CPC ............ *B62D 21/152* (2013.01); *B60R 19/24* (2013.01); *B62D 21/02* (2013.01)

(58) Field of Classification Search
  None
  See application file for complete search history.

(56) References Cited

U.S. PATENT DOCUMENTS

| | | |
|---|---|---|
| 8,807,632 B2 | 8/2014 | Ramoutar et al. |
| 8,991,903 B1 | 3/2015 | Alavandi et al. |
| 9,180,828 B2 | 11/2015 | Sakakibara et al. |
| 9,242,675 B2 | 1/2016 | Kuriyama et al. |
| 9,272,679 B1 | 3/2016 | Ramoutar et al. |
| 9,421,927 B2 * | 8/2016 | Basappa .............. B62D 21/152 |
| 9,487,237 B1 * | 11/2016 | Vollmer ............. B62D 25/2018 |

(Continued)

FOREIGN PATENT DOCUMENTS

| | | |
|---|---|---|
| DE | 102011004105 A1 | 8/2012 |
| DE | 102011116448 A1 | 4/2013 |

(Continued)

OTHER PUBLICATIONS

German Office Action dated Apr. 4, 2019 re Appl. No. DE102018207597.2; original version and computerized English Translation.

*Primary Examiner* — Lori L Lyjak
(74) *Attorney, Agent, or Firm* — Frank A. MacKenzie; Bejin Bieneman PLC

(57) ABSTRACT

A chassis for a motor vehicle includes a longitudinal axis, at least one longitudinal member, and a front bumper fastened to the longitudinal member. The front bumper includes a region protruding over the longitudinal member in the lateral direction (y-direction). The chassis includes a support which has a transverse limb and a longitudinal limb. The longitudinal member has an outer face and the support is fastened at the transverse limb to the outer face of the longitudinal member. The transverse limb extends laterally to the outer face. The longitudinal limb adjoins the transverse limb laterally on the outside and extends in the longitudinal direction away from the front bumper.

11 Claims, 2 Drawing Sheets

(56) References Cited

U.S. PATENT DOCUMENTS

| | | | |
|---|---|---|---|
| 2004/0195862 A1* | 10/2004 | Saeki | B62D 21/152 296/187.09 |
| 2013/0328334 A1* | 12/2013 | Hoiss | B60R 19/24 293/154 |
| 2014/0062129 A1 | 3/2014 | Syed et al. | |
| 2014/0246880 A1* | 9/2014 | Barbat | B62D 21/152 296/187.1 |
| 2014/0354008 A1 | 12/2014 | Sakakibara et al. | |
| 2014/0361559 A1 | 12/2014 | Sakakibara et al. | |
| 2015/0298634 A1* | 10/2015 | Hara | B60R 19/24 293/133 |
| 2017/0073014 A1 | 3/2017 | Alwan et al. | |
| 2017/0113735 A1* | 4/2017 | Kawabe | B60R 19/34 |
| 2018/0194399 A1* | 7/2018 | Grattan | B62D 21/05 |
| 2018/0194400 A1* | 7/2018 | Grattan | B62D 21/07 |
| 2019/0329824 A1* | 10/2019 | Grattan | B62D 25/082 |

FOREIGN PATENT DOCUMENTS

| | | |
|---|---|---|
| DE | 102013012769 A1 | 2/2015 |
| DE | 202016104652 U1 | 1/2017 |
| DE | 102015012140 A1 | 3/2017 |
| JP | 2006224728 A | 8/2006 |
| JP | 2012166743 A | 9/2012 |

* cited by examiner

CHASSIS FOR A MOTOR VEHICLE

CROSS-REFERENCE TO RELATED APPLICATION

This patent application claims priority to German Application No. DE 102018207597.2 filed on May 16, 2018, which is hereby incorporated by reference in its entirety.

SUMMARY

The present disclosure relates to a chassis for a motor vehicle and a motor vehicle.

In connection with the safety of motor vehicles, these motor vehicles are generally subjected to various crash tests and have to meet certain standards for the registration thereof. For specific safety standards, for example the IIHS (Insurance Institute for Highway Safety) safety protocol, trucks also have to fulfill specific requirements in connection with crash tests with an obstacle having a small overlap (SORB—Small Overlap Rigid Barrier). The aforementioned standards are also increasingly implemented globally for motor vehicles, in particular trucks and mini-vans.

The aforementioned SORB test requirements represent a requirement for trucks, vans and mini-vans since, in comparison with passenger motor vehicles, generally these vehicles have a significantly shorter hood measured in the longitudinal direction, i.e. along an x-axis, from the front face of the vehicle in the direction of the rear face, with at the same time a greater vehicle mass. In other words, the spacing from the front face or front side of the vehicle to the driver's cab is significantly shorter than in passenger motor vehicles. This has the result that in the event of a crash with an obstacle with a small overlap (SORB) the vehicle tends to be compressed from the front instead of rebounding from the barrier and causing a deflection of the load from the back-up structure, in particular the driver's cab or the passenger compartment. Transferring the collision load directly into the back-up structure does not fulfill the required safety standards in this type of vehicle and/or platform, in particular when the vehicle structure is overloaded.

In the aforementioned vehicles, in comparison with passenger motor vehicles, firstly less space is available in order to absorb or to deflect impact energy. Secondly, these vehicles are heavier than passenger motor vehicles which has the result that a greater impact energy has to be absorbed or deflected by the vehicle structure. Moreover, these vehicles are generally wider, i.e. longer in the y-direction and/or transverse direction or lateral direction than passenger motor vehicles, with the result that the relatively defined y-overlap of the SORB obstacle is also greater, by for example 25%, relative to the vehicle width. In order to achieve rebound, therefore, the vehicle has to be moved to a greater extent and/or over a longer distance to the side in the y-direction in order to achieve rebound or glancing-off.

In passenger motor vehicles, front bumpers which protrude laterally over the longitudinal member of the chassis are generally provided in order to fulfill the safety requirements in connection with collisions with an obstacle with a small overlap. In the longitudinal direction and/or x-direction behind the protruding region of the bumper, generally devices are attached to the longitudinal member, for example blocks, the protruding region of the bumper being pushed thereagainst in the case of a collision. Examples thereof are disclosed in the documents DE 10 2013 012 769 A1, US 2014/0062129 A1 and U.S. Pat. No. 9,180,828 B2.

In view of the described background, it is the object of the present disclosure to provide a chassis for a motor vehicle, in particular for a truck, van or mini-van which improves the rebound behavior in connection with SORB tests. A further object is to provide a corresponding motor vehicle.

The chassis according to the disclosure for a motor vehicle comprises a longitudinal axis, at least one longitudinal member and a front bumper fastened to the longitudinal member. The front bumper comprises a region protruding over the longitudinal member in the lateral direction and/or in the transverse direction. The chassis comprises a support. The support has a transverse limb and/or lateral limb and a longitudinal limb and/or limb in the longitudinal direction. The longitudinal member has an outer face. The support is fastened to the outer face of the longitudinal member. The support is fastened at the transverse limb to the outer face of the longitudinal member. The transverse limb extends laterally and/or transversely to the outer face. The longitudinal limb of the support adjoins the transverse limb laterally on the outside and extends in the longitudinal direction, in the direction away from the front bumper. The longitudinal limb may extend parallel to the longitudinal member toward the rear.

The support may be fastened at the transverse limb to the outer face of the longitudinal member at a spacing from the front bumper. The spacing is advantageously fixed and/or dimensioned such that, in the case of a collision with an obstacle with a small overlap (SORB), the region of the front bumper protruding in the lateral direction over the longitudinal member is pushed against the support and the support is pushed with its longitudinal limb against the outer face of the longitudinal member.

The region protruding over the longitudinal member may, in particular, have a length of 100 millimeters to 200 millimeters, for example a length of 150 millimeters. The spacing between the transverse limb and the front bumper may be between 190 millimeters and 210 millimeters, for example 200 millimeters. The transverse limb may, in particular, have a length of 100 millimeters to 200 millimeters, for example a length of 150 millimeters. The longitudinal limb may, for example, in particular have a length of 90 millimeters to 120 millimeters, for example a length of 105 millimeters.

The chassis includes two longitudinal members, for example a longitudinal member extending along the right-hand side of the vehicle and a longitudinal member extending along the left-hand side of the vehicle. Advantageously, in each case a described support is fastened to both longitudinal members, in each case to the outer face.

The chassis has the advantage that in a simple manner it deflects a load which is present due to a collision with an obstacle with a small overlap and significantly improves the rebound behavior. In particular, the absorption of a load is reinforced by the longitudinal member. This permits rebound even in vehicles having a high weight and a small spacing between the front bumper and the passenger compartment and/or driver's cab.

The support is also arranged relative to the longitudinal member in the vertical direction, i.e. in the z-direction such that the longitudinal limb is level with the outer face of the longitudinal member. In a preferred variant, the transverse limb has an end face which bears against the outer face of the longitudinal member. For example, the end face may be fastened directly to the outer face of the longitudinal member.

The support may be designed to be L-shaped. In particular, the longitudinal limb may be arranged perpendicular to the transverse limb. In a further advantageous variant, the transverse limb is longer than the longitudinal limb. Moreover, the longitudinal limb may have an end face. In the case of a collision, this has the advantage that the longitudinal limb is pushed with the end face at an angle which is advantageous for the transmission of a load, for example 45 degrees (45°), against the outer face of the longitudinal member.

In a further variant, the transverse limb of the support is arranged relative to its longitudinal position on the longitudinal member, in particular the position in the x-direction, such that it is aligned with the front line of a position for a drive train. In other words, the transverse limb may comprise a front face which is arranged at the same longitudinal position as a front face of the drive train. In this manner, in the case of a collision the drive train is protected, on the one hand, and acts in a self-stabilizing manner, on the other hand. Additionally, the longitudinal member is stabilized in this region.

Advantageously, the support is designed, in particular relative to its material and/or its stiffness and/or its shape, such that in the case of a collision with an obstacle with a small overlap (25% of the vehicle width) the transverse limb is deformed. In the case of a collision the transverse limb is bent about a vertical axis (z-axis). In this case, the vertical axis (z-axis) extends perpendicular to the longitudinal axis (x-axis) and perpendicular to a transverse axis (y-axis), wherein the longitudinal axis (x-axis) and the transverse axis (y-axis) extend in a horizontal plane perpendicular to one another.

The support may be fastened to the longitudinal member by adhesive bonding and/or welding and/or screwing or in a different manner.

The chassis may also be designed as a self-supporting body.

In the case of a collision, the chassis according to the invention forms a solid multilayered rebound surface, made up of the front bumper, the longitudinal limb and the longitudinal member. In this case, the front bumper is supported by the longitudinal limb of the support which in turn is supported by the longitudinal member and by the drive train. This rebound surface enables rebound of the vehicle even for heavy loads and enables the vehicle to be pushed to the side of the obstacle with a small overlap. As a result, the obstacle is prevented from penetrating into a driver's cab or the passenger compartment or the back-up structure. The force acting mainly in the longitudinal direction and/or lengthwise direction or the x-direction on the vehicle due to the obstacle is thus deflected in the transverse direction and/or lateral direction or y-direction, wherein the extent depends on the rebound angle so that rebound and deflection of the load may be achieved.

The motor vehicle according to the disclosure includes a chassis described above. It has the same advantages as the chassis according to the disclosure above. It is characterized, in particular, by improved test results in connection with collisions with an obstacle with a small overlap. The motor vehicle may be a truck, a van, a mini-van or a passenger motor vehicle.

The disclosure is described in more detail hereinafter by means of exemplary embodiments with reference to the accompanying figures.

DETAILED DESCRIPTION

Figure 1:
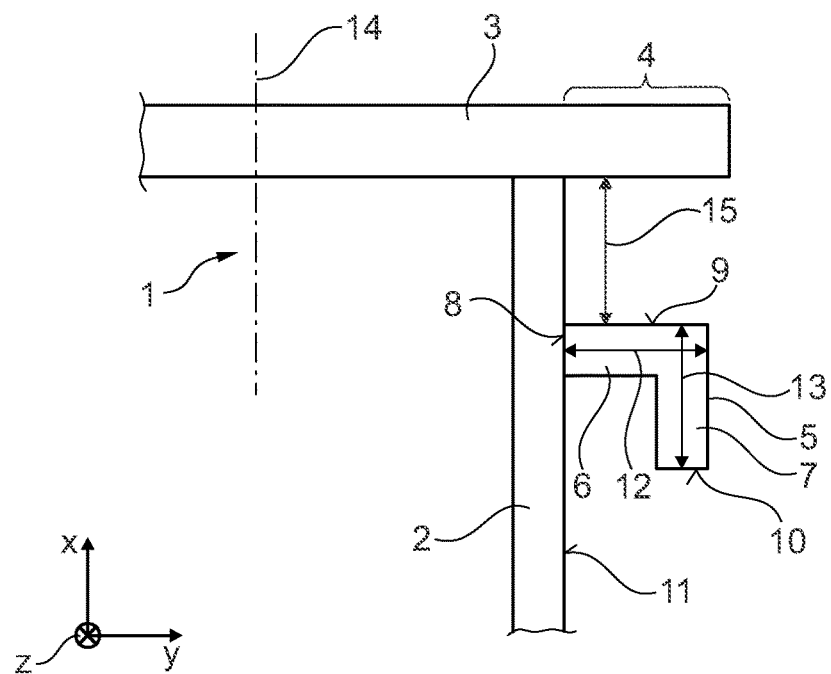
FIG. 1 shows schematically a detail of a chassis according to the invention in a view from below.

The chassis 1 according to the disclosure shown in FIG. 1 comprises a longitudinal axis 14. The x-direction is defined parallel to this longitudinal axis 14. The y-direction extends horizontally perpendicular to the x-direction and transversely to the longitudinal axis 14. The chassis may include two longitudinal members 2. A front bumper 3 is fastened to the longitudinal member 2. The front bumper 3 extends laterally and/or transversely to the longitudinal axis 14 and to the longitudinal member 2. The front bumper 3 comprises a region 4 protruding in the lateral direction and/or y-direction over the longitudinal member 2 which, for example, has a length of 150 millimeters (150 mm), i.e. protrudes by 150 millimeters over the longitudinal member 2. The chassis 1 additionally comprises a support 5. The support 5 comprises a transverse limb 6 and a longitudinal limb 7.

The longitudinal member 2 has an outer face 11. The support 5 is fastened at the transverse limb 6 to the outer face 11 of the longitudinal member 2. In the variant shown, the transverse limb 6 has an end face 8. The end face 8 bears against the outer face 11. The end face 8 may be fastened directly to the outer face 11. However, other fastening options are also possible. The transverse limb may, for example, be adhesively bonded and/or screwed and/or welded to the longitudinal member 2.

The transverse limb 6 extends in the transverse direction, i.e. the y-direction, outwardly. In other words, the transverse limb protrudes to the side outwardly from the outer face 11. The longitudinal limb 7 adjoining the transverse limb 6 to the side on the outside extends in the longitudinal direction, i.e. the x-direction, in the direction remote from the front bumper 3. In other words, the longitudinal limb 7 extends parallel to the longitudinal member 2 toward the rear.

The support 5 may be designed to be L-shaped, wherein the transverse limb 6 is longer than the longitudinal limb 7. In the variant shown, the transverse limb has a length 12, for example 150 millimeters (150 mm) and the longitudinal limb has a length 13, for example 105 millimeters (105 mm). The length 12 may be greater than the length 13.

The transverse limb 6 additionally has a front face 9. The support 5 is fastened at the transverse limb to the outer face 11 of the longitudinal member 2 at a spacing 15, for example of 200 millimeters (200 mm) from the front bumper. In the variant shown, the spacing 15 is measured from the front face of the transverse limb to the front bumper 3. The spacing is fixed such that, in the case of a collision with an obstacle with a small overlap, the region 4 of the front bumper 3 protruding in the lateral direction over the longitudinal member is pushed against the support 5 and the support 5 is pushed with its longitudinal limb 7 against the outer face 11 of the longitudinal member 2. In an advantageous variant, the longitudinal limb 7 has an end face 10, wherein in the case of a collision the end face 10 is pushed against the outer face 11 of the longitudinal member 2. This permits an efficient deflection of the load.

Figure 2:
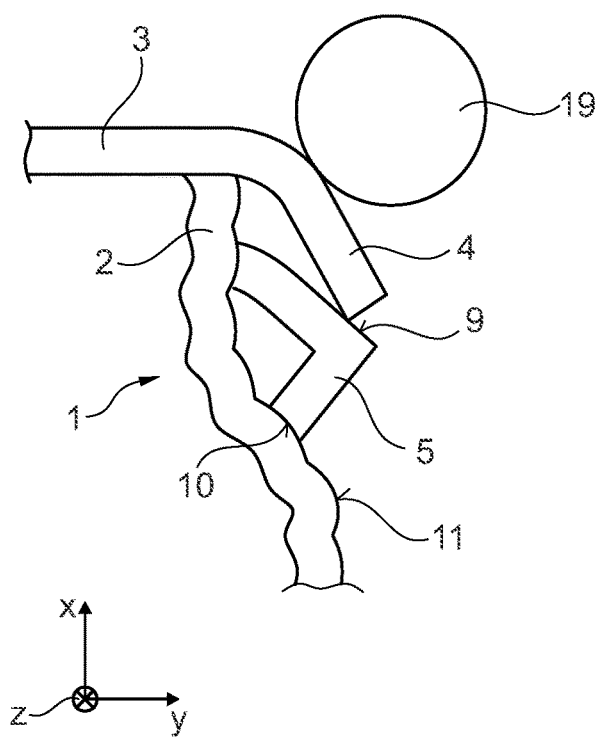
FIG. 2 shows schematically the chassis shown in FIG. 1 after a collision with an obstacle with a small overlap.

The detail shown in FIG. 1 of a chassis according to the disclosure after a collision is shown schematically in FIG. 2. Due to the collision with an obstacle 19 with a small overlap, the longitudinal member 2 has been deformed. In the situation shown, the transverse limb 6 has also been deformed.

The transverse limb has been bent around a vertical axis, i.e. z-axis. The pushing together of the region 4 of the front bumper protruding over the longitudinal member, the transverse limb 6 supported by the longitudinal limb 7 and the longitudinal member 2 produces a stable structure which deflects the load caused by the impact and pushes the vehicle to the side.

Figure 3:
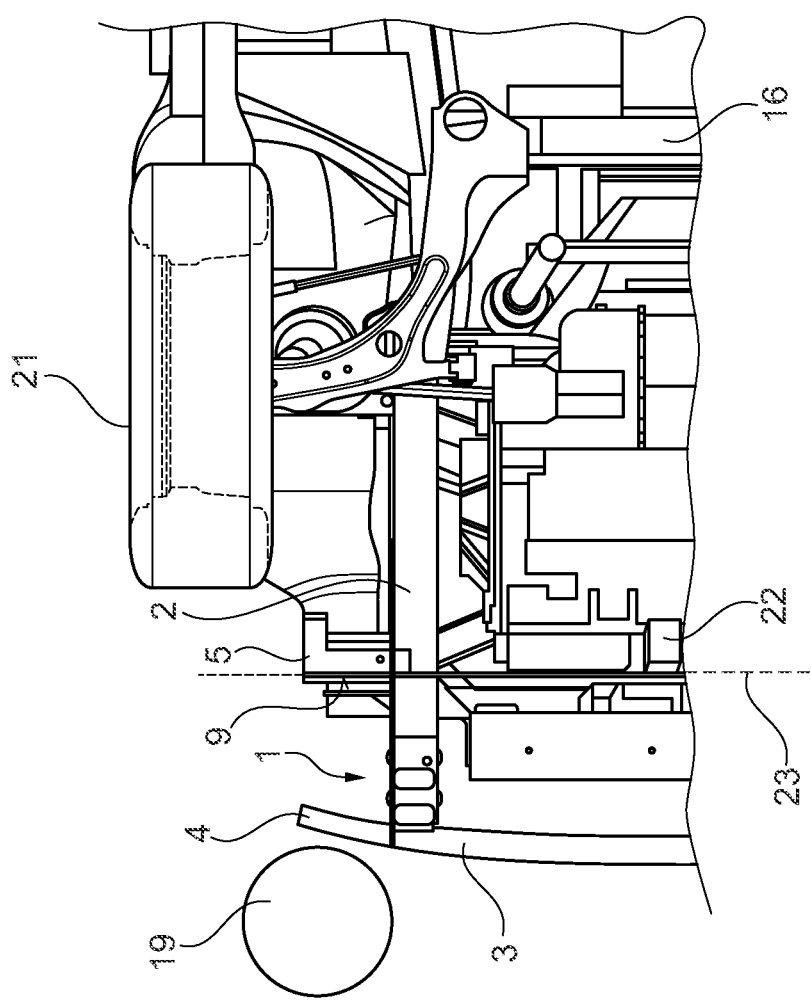
FIG. 3 shows schematically a detail of a motor vehicle according to the invention in a view from below.

In FIG. 3 a detail of a motor vehicle in a view from below is shown. The motor vehicle may be a truck, a van, a mini-van or a passenger motor vehicle. The motor vehicle 20 includes a number of wheels 21, a drive train 22, a back-up structure 16 which, in particular, includes a driver's cab or a passenger compartment and a chassis 1. In the variant shown, the chassis 1 is located in a position for fastening the drive train 22 by which a front line 23 is defined. In the variant shown, the front face 9 of the transverse limb 6 of the support 5 is aligned with the front line 23 of the position of the drive train 22. The obstacle used for a crash test is identified by the reference numeral 19.

LIST OF REFERENCE NUMERALS

1 Chassis
2 Longitudinal member
3 Front bumper
4 Region protruding over the longitudinal member
5 Support
6 Transverse limb
7 Longitudinal limb
8 End face
9 Front face
10 End face
11 Outer face
12 Length (y-axis)
13 Length (x-axis)
14 Longitudinal axis
15 Spacing between front bumper and front face
16 Back-up structure
19 Obstacle
20 Motor vehicle
21 Wheel
22 Drive train
23 Front line

The invention claimed is:

1. A chassis comprising:
a longitudinal member elongated along a vehicle-longitudinal axis;
a front bumper supported by the longitudinal member, the front bumper including an outboard region protruding outboard relative to the longitudinal member in a vehicle-lateral direction; and
a support having a transverse limb and a longitudinal limb;
the transverse limb being fixed to the longitudinal member and extending outboard from longitudinal member in the vehicle-lateral direction;
the longitudinal limb extending from the transverse limb along the vehicle-longitudinal axis away from the front bumper to an end face;
the support being positioned to be impacted by the outboard region of the front bumper during a vehicle collision with an obstacle overlapping the outboard region and the end face positioned to contact the longitudinal member during the vehicle collision.

2. The chassis as set forth in claim 1, wherein the longitudinal member has an outer face and the longitudinal limb is fixed to the outer face.

3. The chassis as claimed in claim 2, wherein the support is fixed to the outer face of the longitudinal member at a spacing from the front bumper, wherein the spacing is fixed such that, in the case of a collision with the obstacle, the region of the front bumper protruding in the lateral direction over the longitudinal member is pushed against the support and the support is pushed with its longitudinal limb against the outer face of the longitudinal member.

4. The chassis as claimed in claim 3, wherein the support is L-shaped.

5. The chassis as claimed in claim 1, wherein the support is L-shaped.

6. The chassis as claimed in claim 5, wherein the transverse limb is longer than the longitudinal limb.

7. The chassis as claimed in claim 1, wherein the transverse limb is longer than the longitudinal limb.

8. The chassis as claimed in claim 1, wherein the transverse limb of the support is arranged relative to its longitudinal position on the longitudinal member such that it is aligned with the front line of a position for a drive train.

9. The chassis as claimed in claim 1, wherein the support is designed such that in the case of a collision with the obstacle the transverse limb is deformed.

10. The chassis as claimed in claim 1, further comprising a second longitudinal member elongated along the vehicle-longitudinal axis, the front bumper supported by the second longitudinal member.

11. The chassis as claimed in claim 1, wherein the transverse limb bends about a vertical axis during the collision with the obstacle.

* * * * *